US 8,373,646 B2

(12) United States Patent
Park et al.

(10) Patent No.: US 8,373,646 B2
(45) Date of Patent: Feb. 12, 2013

(54) BACKLIGHT DEVICE AND DISPLAY APPARATUS HAVING THE SAME

(75) Inventors: Kyu-Jin Park, Ansan-si (KR); Hyoung-Hak Kim, Cheonan-si (KR); Sang-Hoon Park, Yongin-si (KR)

(73) Assignee: Samsung Display Co., Ltd. (KR)

( * ) Notice: Subject to any disclaimer, the term of this patent is extended or adjusted under 35 U.S.C. 154(b) by 482 days.

(21) Appl. No.: 12/625,514

(22) Filed: Nov. 24, 2009

(65) Prior Publication Data

US 2010/0302289 A1 Dec. 2, 2010

(30) Foreign Application Priority Data

Nov. 25, 2008 (KR) .................. 10-2008-0117489

(51) Int. Cl.
*G09G 3/36* (2006.01)

(52) U.S. Cl. .............. 345/102; 345/47; 345/48; 345/84; 345/87; 345/103; 345/691

(58) Field of Classification Search ........................ None
See application file for complete search history.

(56) References Cited

U.S. PATENT DOCUMENTS

2007/0052664 A1* 3/2007 Hirakata et al. .............. 345/102
2008/0191634 A1* 8/2008 Jeong ........................ 315/209 R

FOREIGN PATENT DOCUMENTS

| JP | 2001-166278 | 6/2001 |
| KR | 10-2008-008021 A | 1/2008 |
| KR | 10-2008-0042355 A | 5/2008 |

* cited by examiner

*Primary Examiner* — Joseph Haley
*Assistant Examiner* — Ifedayo Iluyomade
(74) *Attorney, Agent, or Firm* — Innovation Counsel LLP (57) ABSTRACT

In a backlight device and a driving method thereof, a voltage controller controls a voltage level of a first input voltage in response to a dimming signal to output a second input voltage. A pulse generator receives the second input voltage from the voltage controller and generates a pulse signal having a duty ratio corresponding to the dimming signal and a high voltage level corresponding to the second input voltage. An inverter generates a lamp driving signal based on the pulse signal. At least one lamp included in the backlight device is turned on or turned off in response to a lamp driving signal to adjust luminance of the backlight device.

17 Claims, 5 Drawing Sheets

BACKLIGHT DEVICE AND DISPLAY APPARATUS HAVING THE SAME

This application claims priority upon Korean Patent Application No. 2008-0117489, filed on Nov. 25, 2008, the contents of which are herein incorporated by reference in its entirety, and all the benefits accruing from under 35 U.S.C. §119.

BACKGROUND

1. Field of the Invention

The present invention relates to a backlight device and a display apparatus having the same. More particularly, the present invention relates to a backlight device capable of controlling luminance of light emitted therefrom and a display apparatus having the backlight device.

2. Description of the Related Art

In general, a liquid crystal display ("LCD") includes an LCD panel displaying an image and a backlight device supplying light to the LCD panel. The backlight assembly employs a cold cathode fluorescent lamp ("CCFL") as its light source in one example.

An LCD may employ a dimming scheme controlling luminance of a backlight device for the purpose of increasing a contrast ratio of a display screen and reducing power consumption. The dimming scheme is classified into a pulse width modulation (PWM) control scheme and a tube current modulation scheme in one example.

In the PWM control scheme, a CCFL is repeatedly turned on and turned off in accordance with a duty ratio of a PWM signal. The PWM control scheme controls luminance of the backlight device by controlling on-off operation of the CCFL. On the other hand, the tube current modulation scheme varies the tube current of the CCFL by adjusting a level of a voltage applied to the CCFL, thereby controlling luminance of the backlight device. Since the tube current modulation scheme has a disadvantage of being difficult to control luminance in a low current, recently the PWM control scheme has been mainly used in an LCD rather than the tube current modulation scheme.

However, since the PWM control scheme controls the on-off operation of the CCFL, noise may disadvantageously occur due to coils in the inverter that repeatedly turns on and off the CCFL.

SUMMARY

An embodiment of the present invention provides a backlight device capable of removing noises from an inverter and increasing a luminance adjusting range.

Another embodiment of the present invention provides a display apparatus having the backlight device.

In an embodiment of the present invention, a backlight device includes a voltage controller, a pulse generator, an inverter, and a light source unit.

The voltage controller controls a voltage level of a first input voltage in response to a dimming signal provided from an exterior to output a second input voltage. The pulse generator receives the second input voltage from the voltage controller and generates a pulse signal having a duty ratio corresponding to the dimming signal and a high voltage level corresponding to the second input voltage. The inverter generates a driving signal based on the pulse signal, and the light source unit generates a light in response to the driving signal.

In another embodiment of the present invention, a display apparatus includes a panel driver, a display panel, and a backlight device.

The panel driver generates a panel driving signal and a dimming signal in response to an image data signal and a control signal. The display panel displays an image in response to the panel driving signal. The backlight device supplies a light to a rear face of the display panel and controls luminance of the light supplied to the display panel based on the dimming signal from the panel driver. The backlight device includes a voltage controller, a pulse generator, an inverter, and a light source unit.

The voltage controller controls a voltage level of a first input voltage in response to the dimming signal to output a second input voltage. The pulse generator generates a pulse signal having a duty ratio corresponding to the dimming signal and a high voltage level corresponding to the second input voltage. The inverter generates a lamp driving signal based on the pulse signal, and the light source unit generates the light in response to the lamp driving signal.

According to the above, the voltage controller controls the input voltage according to the dimming signal that determines an amplitude of the pulse signal, so that on-off operation of the lamp may be controlled by the amplitude and the duty ratio of the pulse signal.

Therefore, even if the lamp is incompletely turned off in order to remove noise from the on-off operation of the lamp, a luminance adjusting range may be prevented from being reduced.

BRIEF DESCRIPTION OF THE DRAWINGS

The above and other aspects, advantages and features of the present invention will become readily apparent by reference to the following detailed description when considered in conjunction with the accompanying drawings wherein.

DETAILED DESCRIPTION OF THE INVENTION

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in further detail with reference to the accompanying drawings.

Figure 1:
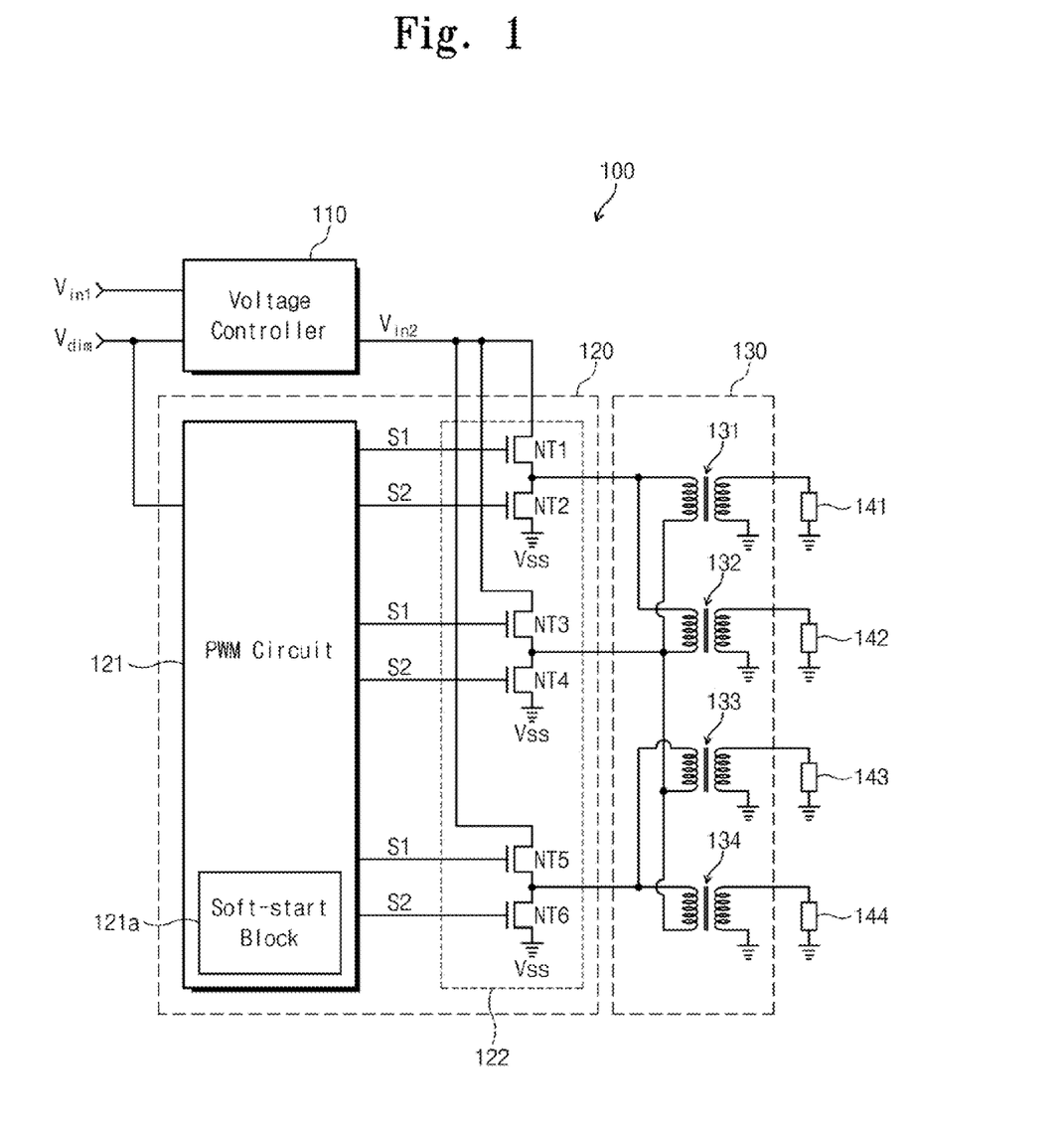
FIG. 1 is a block diagram showing an embodiment of a backlight device according to the present invention.
Figure 2:
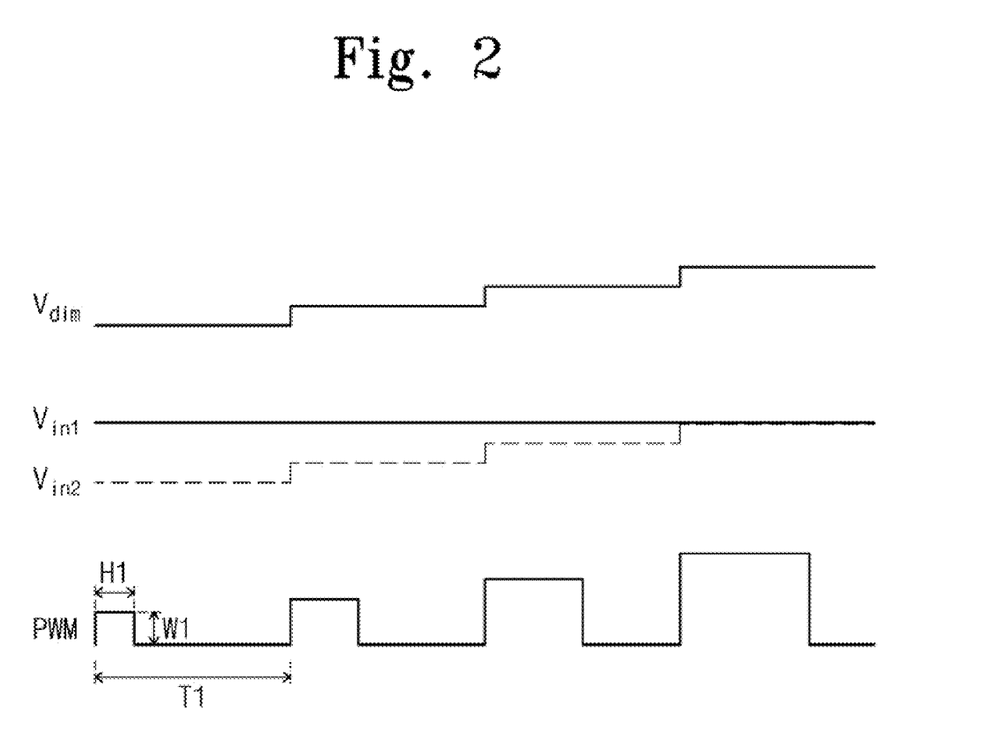
FIG. 2 is a timing diagram of signals shown in FIG. 1.

FIG. 1 is a block diagram showing an embodiment of a backlight device according to the present invention. FIG. 2 is a timing diagram of signals shown in FIG. 1.

Referring to FIG. 1, a backlight device 100 includes a voltage controller 110, a pulse generator 120, an inverter 130, and a plurality of lamps 141, 142, 143, and 144.

As shown in FIGS. 1 and 2, the voltage controller 110 receives a first input voltage $V_{in1}$ and a dimming voltage $V_{dim}$ from an external device (not shown). The first input voltage $V_{in1}$ and the dimming voltage $V_{dim}$ are direct current voltages. The voltage controller 110 outputs a second input voltage $V_{in2}$ that has a voltage level lower than that of the first input voltage $V_{in1}$ by a predetermined voltage level according to a voltage level of the dimming voltage $V_{dim}$. Thus, as the dimming voltage $V_{dim}$ decreases, a voltage difference between the first input voltage $V_{in1}$ and the second input voltage $V_{in2}$ increases, and, on the contrary, as the dimming voltage $V_{dim}$ increases, the voltage difference between the first input voltage $V_{in1}$ and the second input voltage $V_{in1}$ decreases.

The pulse generator 120 includes a pulse width modulation ("PWM") circuit 121 and a switching circuit 122. The PWM circuit 121 outputs a first switching signal S1 and a second switching signal S2 based on the dimming voltage $V_{dim}$.

High periods of the first and second switching signals S1 and S2 are alternately generated, and a width of each high period of the first and second switching signals S1 and S2 varies according to the dimming voltage $V_{dim}$. In particular, as the dimming voltage $V_{dim}$ increases, the high period width of the first switching signal S1 increases, but the high period width of the second switching signal S2 decreases.

The switching circuit 122 receives the second input voltage $V_{in2}$ from the voltage controller 110 and switches the second input voltage $V_{in2}$ in response to the first and second switching signals S1 and S2. In the present embodiment, the switching circuit 122 may include a plurality of transistors NT1, NT2, NT3, NT4, NT5, and NT6 to switch the second input voltage $V_{in2}$ and a ground voltage Vss in response to the first and second switching signals S1 and S2.

The switching circuit 122 outputs the second input voltage $V_{in2}$ during the high period of the first switching signal S1, and outputs the ground voltage Vss during the high period of the second switching signal S2. Therefore, the pulse signal PWM from the switching circuit 122 has a high voltage level corresponding to the second input voltage $V_{in2}$ during the high period of the first switching signal S1 and a low voltage level corresponding to the ground voltage Vss during the low period of the first switching signal S1.

Consequently, since the voltage level of the pulse signal PWM is controlled by the first and second switching signals S1 and S2, a ratio (hereinafter, referred to as a duty ratio) of a high period H1 to one period T1 of the pulse signal PWM may be determined by the voltage level of the dimming voltage $V_{dim}$. The voltage level of the second input voltage $V_{in2}$ decreases from the voltage level of the first input voltage $V_{in1}$ in proportion to the duty ratio. Also, since the second input voltage $V_{in2}$ is output as the high voltage level of the pulse signal PWM during the high period of the first switching signal S1, an amplitude W1 of the pulse signal PWM decreases in proportion to the duty ratio. Thus, when the duty ratio is about 100%, the pulse signal PWM has the amplitude W1 corresponding to the first input voltage $V_{in1}$, but the pulse signal PWM has the amplitude W1 corresponding more to the second input voltage $V_{in2}$ as the duty ratio decreases. In this way, the amplitude W1 of the pulse signal PWM may be varied in proportion to the duty ratio.

The inverter 130 includes a first transformer 131, a second transformer 132, a third transformer 133, and a fourth transformer 134, which are connected to the first to fourth lamps 141 to 144, respectively. Specifically, a primary coil of each of the first to fourth transformers 131 to 134 is connected to the switching circuit 122, and a secondary coil of each of the first to fourth transformers 131 to 134 is connected to a corresponding lamp of the first to fourth lamps 141 to 144. Therefore, each of the first to fourth transformers 131 to 134 converts the pulse signal PWM into an alternating current power (hereinafter, referred to as a lamp driving signal) having a high voltage level and outputs the lamp driving signal to the corresponding lamp.

The lamp driving signal has a lamp-on period corresponding to a high period of the pulse signal PWM and a lamp-off period corresponding to a low period of the pulse signal PWM. The first to fourth lamps 141 to 144 are turned on or turned off in response to the lamp driving signal to control luminance of the light emitted from the backlight device 100.

In the present embodiment, each of the first to fourth lamps 141 to 144 may include a cold cathode fluorescent lamp ("CCFL"). However, the first to fourth lamps 141 to 144 are not limited to the CCFL, and may include various light sources such as a light emitting diode, etc.

Although not shown in FIGS. 1 to 2, time points at which the first to fourth lamps 141 to 144 are turned on may be set differently from each other. More particularly, the time points at which the pulse signal PWM is applied to the first to fourth transformers 131 to 134 are set differently from each other. The time points at which the pulse signal PWM is applied to each transformer may be sufficiently controlled by adjusting the switching signals applied to the switching circuit 122.

On the other hand, noise may be generated by the coils of the inverter 130 while the first to fourth lamps 141 to 144 are alternately turned on and turned off. In order to remove the noise, the PWM circuit 121 further includes a control block (hereinafter, referred to as a soft-start block) 121a.

The soft-start block 121a gradually turns on and turns off the first to fourth lamps 141 to 144. In detail, the soft-start block 121a supplies a residual current to the first to fourth lamps 141 to 144 such that the first to fourth lamps 141 to 144 are not completely turned off during the lamp-off period. As a result, the noise may be prevented from occurring in the inverter 130 due to the on-off operation of the first to fourth lamps 141 to 144.

In the present embodiment, the residual current applied to the first to fourth lamps 141 to 144 during the lamp-off period by the soft-start block 121a decreases in proportion to the duty ratio. When the residual current decreases in proportion to the duty ratio and is applied to the first to fourth lamps 141 to 144, a luminance adjusting range of the backlight device 100 may be increased compared with a case that the residual current is supplied to the first to fourth lamps 141 to 144 during the lamp-off period regardless of the duty ratio.

Figure 3:
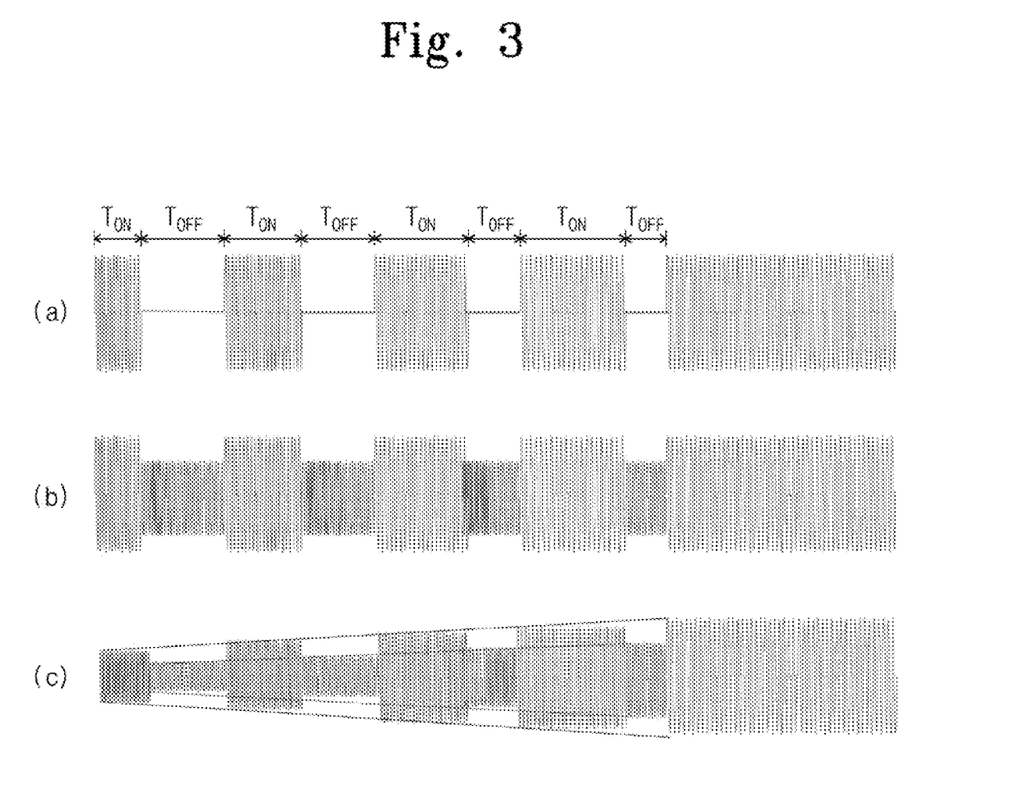
FIG. 3 is a waveforms diagram showing a tube current in each lamp shown in FIG. 1.
Figure 4:
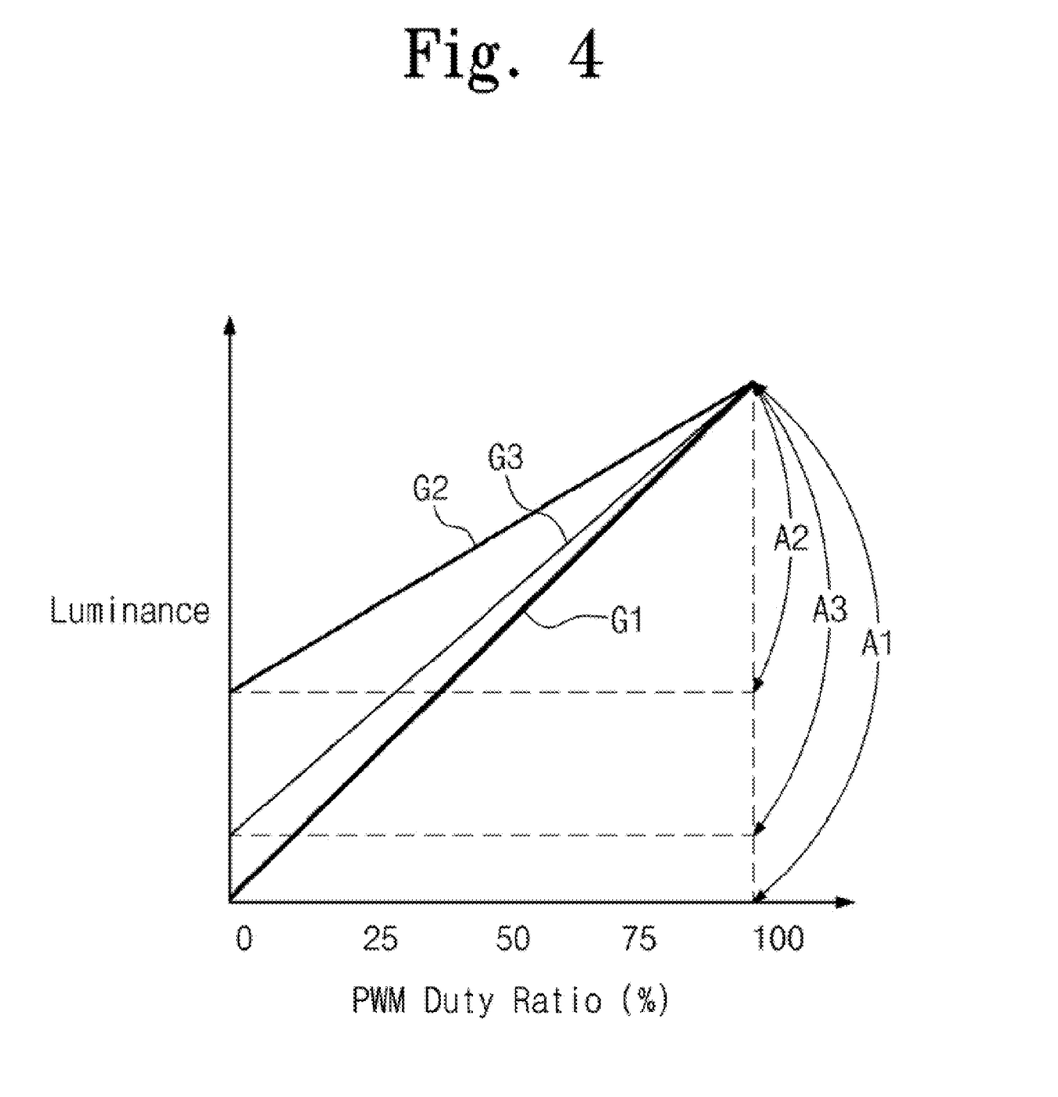
FIG. 4 is a graph showing luminance according to a duty ratio of a pulse signal.

FIG. 3 is a waveforms diagram of a tube-current of a lamp shown in FIG. 1. FIG. 4 is a graph of luminance according to a duty ratio of a pulse signal.

In FIG. 3, (a) is a waveform diagram of a tube current of a lamp according to a first comparison example, (b) is a waveform diagram of a tube current of a lamp according to a second comparison example, and (c) is a waveform diagram of a tube current of a lamp according to an embodiment of the present invention. In FIG. 4, a first graph G1 shows luminance as a function of the duty ratio of the pulse signal PWM according to the first comparison example, a second graph G2 shows luminance as a function of the duty ratio of the pulse signal PWM according to the second comparison example, and a third graph G3 shows luminance as a function of the duty ratio of the pulse signal PWM according to the embodiment of the present invention.

Referring to FIGS. 3(a) and 4, when the lamp is completely turned off by the tube current of zero during a lamp-off period $T_{OFF}$, a luminance adjusting range A1 of the lamp increases. However, in case that the lamp is turned on after completely turning off the lamp, noise remarkably occurs from the coil of the inverter.

Referring to FIGS. 3(b) and 4, in order to remove the noise generated by the coil of the inverter, when a residual current is applied to the lamp during the lamp-off period $T_{OFF}$, the noise is removed, but, as shown in the second graph G2, a luminance adjusting range A2 according to the second comparison example has been decreased compared with the luminance adjusting range A1 according to the first comparison example.

Referring to FIGS. 3(c) and 4, in order to remove the noise generated by the coil of the inverter and increase the luminance adjusting range, when the residual current is applied to the lamp during the lamp-off period $T_{OFF}$ and the amplitude of the pulse signal PWM is adjusted, as shown in the third graph G3, the luminance adjusting range A3 according to the example of the present invention has been increased compared with the luminance adjusting range A2 according to the second comparison example.

Consequently, when the duty ratio and the amplitude of the pulse signal PWM are controlled based on the dimming voltage $V_{dim}$ (shown in FIG. 1), the noise from the inverter may be substantially removed and the luminance adjusting range may increase.

Figure 5:
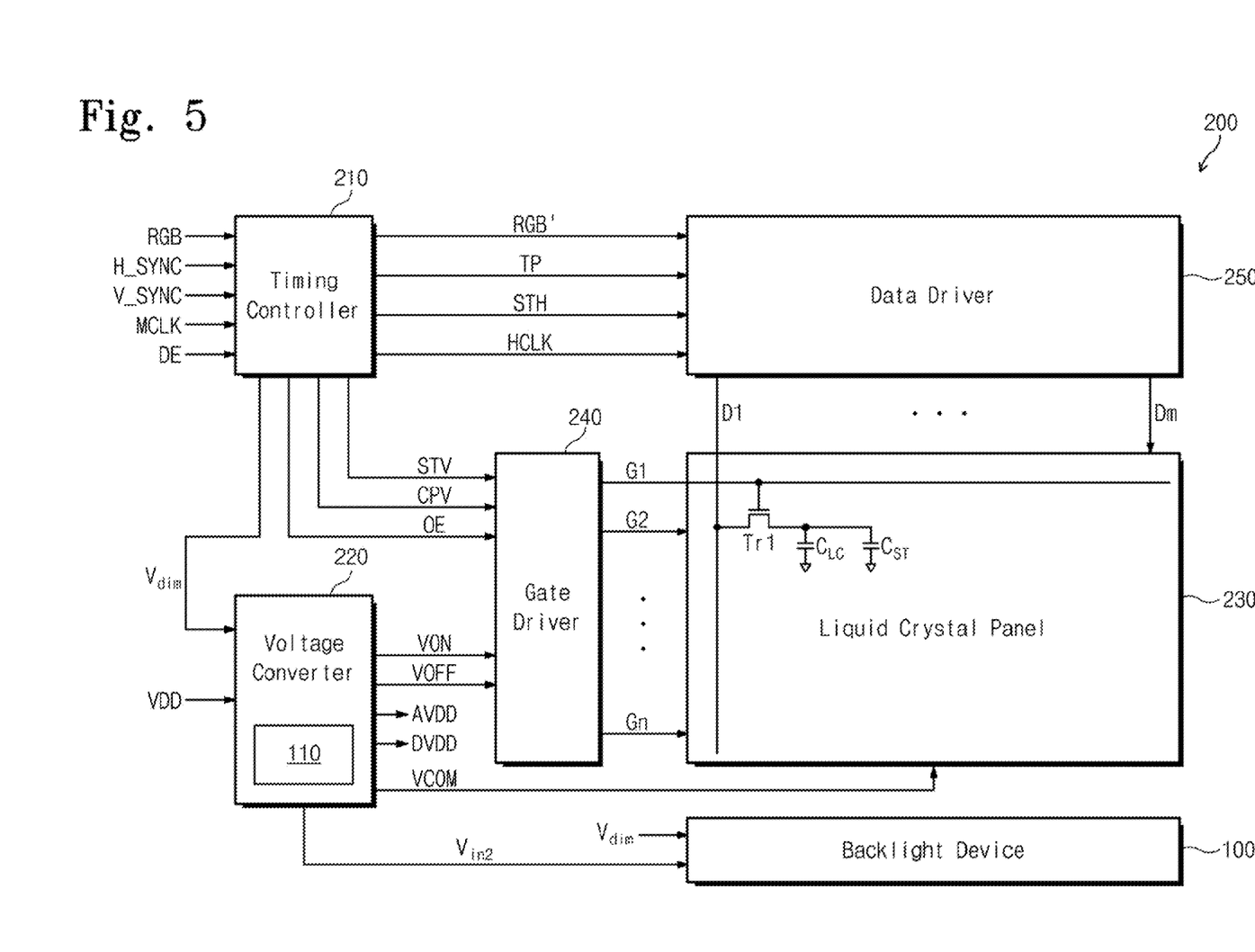
FIG. 5 is a block diagram showing a display apparatus having the backlight device shown in FIG. 1.

FIG. 5 is a block diagram showing a display apparatus having the backlight device shown in FIG. 1. In FIG. 5, the backlight device has substantially the same structure and function as those described in greater detail above with reference to FIGS. 1 and 2. Accordingly, the same reference numerals in FIG. 5 denote the same or like elements as shown in FIG. 1, and any detailed repetitive description thereof will hereinafter be omitted.

Referring to FIG. 5, an LCD 200 includes a timing controller 210, a voltage converter 220, a liquid crystal panel 230, a gate driver 240, a data driver 250, and the backlight device 100.

The timing controller 210 receives an image data signal RGB, a horizontal synchronization signal H_SYNC, a vertical synchronization signal V_SYNC, a main clock signal MCLK, and a data enable signal DE from an external device. The timing controller 210 converts the image data signal RGB having a first data format into an image data signal RGB' having a second data format appropriate to an interface between the data driver 250 and the timing controller 110 and outputs the image data RGB' and control signals. The control signals applied to the data driver 250 may include an output start signal TP, a horizontal start signal STH, and a horizontal clock signal HCLK.

In addition, the timing controller 210 outputs the dimming voltage $V_{dim}$ to control the luminance of the backlight device 100. In the present embodiment, a voltage level of the dimming voltage $V_{dim}$ may be varied according to an average luminance value of the image data signal RGB' applied to the data driver 250, an ambient light illumination, or a variation amount of the image data signal RGB'. The dimming voltage $V_{dim}$ from the timing controller 210 is supplied to the voltage converter 220 and the backlight device 100.

The voltage converter 220 receives a direct current ("DC") power VDD from an outside source to generate a plurality of voltages used to operate the LCD 200. The voltages used to operate the LCD 200 include an analog power voltage AVDD, a digital power voltage DVDD, a gate-on voltage VON, a gate-off voltage VOFF, and a common voltage VCOM. The gate-on voltage VON and the gate-off voltage VOFF are applied to the gate driver 240, and the analog power voltage AVDD and the digital power voltage DVDD are used as an operation voltage of the LCD 200. The common voltage VCOM is provided to a common electrode (not shown) of the liquid crystal panel 230. The voltage converter 220 may be configured in a DC/DC converter (not shown).

In the present embodiment, the voltage controller 110 included in the backlight device 100 may be installed inside the voltage converter 220. When the voltage controller 110 is installed inside the voltage converter 220, the voltage converter 220 generates a first input voltage $V_{in1}$ and varies a voltage level of the first input voltage $V_{in1}$ based on the dimming voltage $V_{dim}$ from the timing controller 210 to output a second input voltage $V_{in2}$. The second input voltage $V_{in2}$ is provided to the backlight device 100.

Meanwhile, the liquid crystal panel 230 includes gate lines G1-Gn, data lines D1-Dm crossing the gate lines G1-Gn, and pixels respectively arranged in pixel areas defined by the gate lines G1-Gn and the data lines D1-Dm. Each pixel has a thin film transistor Tr1, a liquid crystal capacitor $C_{LC}$, and a storage capacitor $C_{ST}$. The thin film transistor Tr1 includes a gate electrode connected to a corresponding gate line of the gate lines G1-Gn, a source electrode connected to a corresponding data line of the data lines D1-Dm, a drain electrode connected to the liquid crystal capacitor $C_{LC}$ and the storage capacitor $C_{ST}$.

In such a pixel structure, the gate lines G1-Gn are sequentially selected by the gate driver 240, and the gate-on voltage VON is applied to the selected gate line in a pulse form. As a result, the thin film transistor Tr1 connected to the selected gate line is turned on. Then, a voltage including pixel information (hereinafter, referred to as a data voltage) may be applied to the data lines D1-Dm by the data driver 250. The data voltage is applied to the liquid crystal capacitor $C_{LC}$ and the storage capacitor $C_{ST}$ after passing through the thin film transistor Tr1 of a corresponding pixel.

The liquid crystal capacitor $C_{LC}$ allows light to pass therethrough according to the data voltage applied through the turned-on thin film transistor Tr1, and the storage capacitor $C_{ST}$ stores the data voltage when the thin film transistor Tr1 is turned on. The storage capacitor $C_{ST}$ supplies the stored data voltage to the liquid crystal capacitor $C_{LC}$ when the thin film transistor Tr1 is turned off. Therefore, the liquid crystal panel 230 may display a desired image thereon through the above method.

Also, the liquid crystal panel 230 includes the common electrode (not shown) that is arranged at an upper portion of the pixels and receives the common voltage VCOM.

The gate driver 240 sequentially scans the gate lines G1-Gn of the liquid crystal panel 230 in response to the control signals provided from the timing controller 210. In the present embodiment, the scanning refers to an operation of sequentially applying the gate-on voltage VON to the gate lines G1-Gn, so that each pixel connected to the gate line to which the gate-on voltage VON is applied can record data.

The data driver 250 generates gray scale voltages using gamma voltages provided by a gamma voltage generator (not shown). The data driver 250 selects gray scale voltages corresponding to the image data signal RGB' among the gray scale voltages generated in response to the control signals provided from the timing controller 110, and applies the selected gray scale voltages to the data lines D1~Dm of the liquid crystal panel 230.

In order to drive the LCD having the above structure, the following operations are performed. When the gate-on voltage VON is applied to the gate electrode of the thin film transistor Tr1 connected to the selected gate line, the thin film transistor Tr1 is turned on. The data voltage corresponding to the image data signal is applied to the source electrode of the thin film transistor Tr1, and then the data voltage may be applied to the drain electrode through the turned-on thin film transistor Tr1. Also, when the common voltage VCOM is applied to the common electrode of the liquid crystal panel 230, the liquid crystals are driven by a voltage difference between the common voltage VCOM and the data voltage. As a result, the LCD 200 may display a desired image thereon.

Although embodiments of the present invention have been described, it is understood that the present invention should not be limited to these embodiments but various changes and modifications can be made by one of ordinary skill in the art within the spirit and scope of the present invention as hereinafter claimed.

What is claimed is:

1. A backlight device comprising: a voltage controller controlling a voltage level of a first input voltage in response to a dimming signal to output a second input voltage; a pulse generator receiving the second input voltage from the voltage controller and generating a pulse signal that has a duty ratio corresponding to the dimming signal and an amplitude corresponding to the second input voltage; an inverter generating a driving signal based on the pulse signal; and a light source unit generating a light in response to the driving signal; wherein the second input voltage decreases from a voltage level of the first input voltage in proportion to the voltage level of the dimming signal; wherein the amplitude of the pulse signal decreases from a voltage level of the second input voltage in proportion to the voltage level of the dimming signal; wherein the duty ratio of the pulse signal varies according to the voltage level of the dimming signal.

2. The backlight device of claim 1, wherein the dimming signal comprises a direct current voltage, and the second input voltage has a voltage level lower than that of the first input voltage by a predetermined level according to a voltage level of the dimming voltage.

3. The backlight device of claim 1, wherein the pulse signal has an amplitude corresponding to the second input voltage when the duty ratio is about 100%.

4. The backlight device of claim 1, wherein the pulse generator comprises:
    a pulse width modulation circuit outputting a switching signal in response to the dimming signal; and
    a switching circuit receiving the second input voltage and output the pulse signal to the inverter in response to the switching signal,
    wherein a width of high period of the switching signal varies according to the voltage level of the dimming signal.

5. The backlight device of claim 4, wherein the inverter comprises a plurality of transformers, and the pulse signal is applied to a primary coil of each transformer.

6. The backlight device of claim 4, wherein the light source unit comprises at least one fluorescent lamp, and a turn-on period and a turn-off period of the fluorescent lamp are determined by the duty ratio of the pulse signal.

7. The backlight device of claim 6, wherein the pulse width modulation circuit further comprises a control block that incompletely turns off the fluorescent lamp during the turn-off period of the fluorescent lamp, wherein the control block reduces a residual current of the fluorescent lamp in proportion to the duty ratio during the turn-off period of the fluorescent lamp.

8. A display apparatus comprising: a panel driver generating a panel driving signal and a dimming signal in response to an image data signal and a control signal; a display panel displaying an image in response to the panel driving signal; and a backlight device supplying a light to a rear face of the display panel and controlling luminance of the light supplied to the display panel based on the dimming signal provided from the panel driver, wherein the backlight device comprises: a voltage controller controlling a voltage level of a first input voltage in response to the dimming signal to output a second input voltage; a pulse generator generating a pulse signal that has a duty ratio corresponding to the dimming signal and an amplitude corresponding to the second input voltage; an inverter generating a lamp driving signal based on the pulse signal; and a light source unit generating the light in response to the lamp driving signal, wherein the second input voltage decreases from a voltage level of the first input voltage in proportion to the voltage level of the dimming signal, wherein the amplitude of the pulse signal decreases from a voltage level of the second input voltage in proportion to the voltage level of the dimming signal, wherein the duty ratio of the pulse signal varies according to the voltage level of the dimming signal.

9. The display apparatus of claim 8, wherein the dimming signal comprises a direct current voltage, and the second input voltage has a voltage level lower than that of the first input voltage by a predetermined level according to a voltage level of the dimming voltage.

10. The display apparatus of claim 8, wherein the pulse signal has the amplitude corresponding to the second input voltage when the duty ratio is about 100%.

11. The display apparatus of claim 8, wherein the pulse generator comprises:
a pulse width modulation circuit outputting a switching signal in response to the dimming signal; and
a switching circuit receiving the second input voltage and output-the pulse signal to the inverter in response to the switching signal,
wherein a width of high period of the switching signal varies according to the voltage level of the dimming signal.

12. The display apparatus of claim 11, wherein the inverter comprises a plurality of transformers, and the pulse signal is applied to a primary coil of each transformer.

13. The display apparatus of claim 11, wherein the light source unit comprises at least one fluorescent lamp, with a turn-on period and a turn-off period of the fluorescent lamp being determined by the duty ratio of the pulse signal.

14. The display apparatus of claim 13, wherein the pulse width modulation circuit further comprises a control block that incompletely turns off the fluorescent lamp during the turn-off period of the fluorescent lamp, wherein the control block reduces a residual current of the fluorescent lamp in proportion to the duty ratio of the pulse signal during the turn-off period of the fluorescent lamp.

15. The display apparatus of claim 13, wherein the panel driver comprises:
a timing controller outputting a gate control signal and a data control signal based on the image data signal and the control signal;
a data driver converting the image data signal into a data voltage of the panel driving signal in response to the data control signal; and
a gate driver outputting a gate voltage of the panel driving signal in response to the gate control signal.

16. The display apparatus of claim 15, wherein the timing controller outputs the dimming signal to the backlight device based on the image data signal.

17. The display apparatus of claim 16, wherein the panel driver further comprises a voltage converter converting an external power voltage into driving voltages for the data and gate drivers, and the voltage controller of the backlight device is installed in the voltage converter.

* * * * *